(12) United States Patent
Katko

(10) Patent No.: US 6,223,054 B1
(45) Date of Patent: Apr. 24, 2001

(54) WIRELESS LOCAL LOOP SYSTEM UTILIZING INDEPENDENT CENTRAL OFFICES LOCATED IN NEW RESIDENTIAL AND COMMERCIAL DEVELOPMENTS

(75) Inventor: Mark G. Katko, Toledo, OH (US)

(73) Assignee: LightSource Telecom, LLC, Cleveland, OH (US)

( * ) Notice: Subject to any disclaimer, the term of this patent is extended or adjusted under 35 U.S.C. 154(b) by 0 days.

(21) Appl. No.: 09/148,462

(22) Filed: Sep. 4, 1998

Related U.S. Application Data

(63) Continuation-in-part of application No. 08/933,545, filed on Sep. 19, 1997, which is a continuation-in-part of application No. 08/890,589, filed on Jul. 9, 1997, which is a continuation-in-part of application No. 08/806,471, filed on Feb. 26, 1997.

(51) Int. Cl.[7] ......................................... H04B 1/38
(52) U.S. Cl. ........................ 455/554; 455/555; 379/231; 379/234
(58) Field of Search ................................ 455/426, 445, 455/458, 554, 555, 560, 3.1, 5.1; 379/229, 230, 231, 232, 233, 234

(56) References Cited

U.S. PATENT DOCUMENTS

| | | | |
|---|---|---|---|
| 4,731,823 | 3/1988 | Warner et al. | 379/220 |
| 4,791,663 | 12/1988 | Rockne et al. | 379/113 |
| 4,802,199 | 1/1989 | Lange et al. | 379/221 |
| 4,890,315 | * 12/1989 | Bendixen et al. | 455/554 |
| 4,897,870 | 1/1990 | Golden | 379/144 |
| 4,924,500 | 5/1990 | Lewis et al. | 379/201 |
| 4,982,421 | 1/1991 | Kirsch et al. | 379/216 |
| 5,023,904 | 6/1991 | Kaplan et al. | 379/91 |
| 5,130,982 | 7/1992 | Ash et al. | 370/85.7 |
| 5,138,657 | 8/1992 | Colton et al. | 379/220 |
| 5,181,238 | 1/1993 | Medamana et al. | 379/95 |

(List continued on next page.)

OTHER PUBLICATIONS

Abstract entitled "2FXO Module ISU Module or Plug–On," AdTran, Huntsville, Alabama, undated.
Abstract entitled "E&M/TO Module TSU/HSU Module or Plug–On," AdTran, Huntsville, Alabama, undated.
Abstract entitled "3630 MainStreet", 1993.
Abstract entitled "Ameritech Reconfiguration Service," Ameritech Data Solutions, undated.

Primary Examiner—Nay Maung
Assistant Examiner—Quochien B. Vuong
(74) Attorney, Agent, or Firm—Woodcock Washburn Kurtz Mackiewicz & Norris LLP

(57) ABSTRACT

A communications platform for enabling the cost-effective deployment of fixed wireless local loop telephone services to residential and commercial subscribers. The platform includes at least one Independent Central Office located within a new residential or commercial development, and connected to the public switched telephone network (PSTN), at least one subscriber base station, and subscriber terminals communicating with the fixed network via a fixed wireless local loop radio path. The customer premise equipment of the telephone subscriber is connected to a switch at the Independent Central Office facility via the fixed wireless local loop radio path, and the switch at the Independent Central Office facility is connected to the incumbent local exchange carrier (LEC) switch at the LEC Central Office facility via direct inward dialing (DID) and direct outbound dialing (DOD) services provided via respective DID and DOD trunk lines. Deployment costs of the Independent Central Office fixed wireless local loop platform are absorbed by building the platform in new residential and/or commercial developments and providing the platform as part of the new communications infrastructure.

6 Claims, 8 Drawing Sheets

U.S. PATENT DOCUMENTS

| | | | |
|---|---|---|---|
| 5,193,087 | 3/1993 | Lichtash et al. | 370/58.2 |
| 5,214,692 | 5/1993 | Chack et al. | 379/265 |
| 5,276,444 | 1/1994 | McNair | 340/825.33 |
| 5,293,376 | 3/1994 | White | 370/54 |
| 5,406,583 | 4/1995 | Dagdeviren | 375/5 |
| 5,425,085 | 6/1995 | Weinberger et al. | 379/112 |
| 5,430,717 | 7/1995 | Fowler et al. | 370/58.2 |
| 5,459,779 | 10/1995 | Backaus et al. | 379/201 |
| 5,463,686 | 10/1995 | Lebourges | 379/220 |
| 5,465,294 | 11/1995 | Chapman, Jr. et al. | 379/207 |
| 5,475,749 | 12/1995 | Akinpelu et al. | 379/221 |
| 5,481,600 | 1/1996 | Alesio | 379/114 |
| 5,481,604 | 1/1996 | Minot | 379/221 |
| 5,510,777 | 4/1996 | Pile et al. | 340/825.31 |
| 5,517,562 | 5/1996 | McConnell | 379/207 |
| 5,524,142 | 6/1996 | Lewis et al. | 379/112 |
| 5,526,413 | 6/1996 | Cheston, III et al. | 379/201 |
| 5,533,111 | 7/1996 | Schlanger | 379/201 |
| 5,537,461 | 7/1996 | Bridges et al. | 379/88 |
| 5,537,464 | 7/1996 | Lewis et al. | 379/114 |
| 5,537,468 | 7/1996 | Hartmann | 379/221 |
| 5,539,817 | 7/1996 | Wilkes | 379/230 |
| 5,550,820 | 8/1996 | Baran | 370/60.1 |
| 5,550,912 | 8/1996 | Akinpelu et al. | 379/221 |
| 5,557,667 | 9/1996 | Bruno et al. | 379/201 |
| 5,566,235 | 10/1996 | Hetz | 379/201 |
| 5,570,410 | 10/1996 | Hooshiari | 379/32 |
| 5,574,783 | 11/1996 | Dunn | 379/230 |
| 5,583,926 | 12/1996 | Venier et al. | 379/207 |
| 5,583,929 | 12/1996 | Ardon | 379/230 |
| 5,754,555 * | 5/1998 | Hurme et al. | 455/5.1 |
| 5,771,275 * | 6/1998 | Brunner et al. | 379/230 |
| 5,787,355 * | 7/1998 | Bannister et al. | 455/458 |
| 5,966,668 * | 10/1999 | Lindroth | 455/555 |
| 6,014,546 * | 1/2000 | Georges et al. | 455/3.1 |

* cited by examiner

OUTBOUND CALLING

INCOMING CALLS

OUTBOUND CALLING

INCOMING CALLS

WIRELESS LOCAL LOOP SYSTEM UTILIZING INDEPENDENT CENTRAL OFFICES LOCATED IN NEW RESIDENTIAL AND COMMERCIAL DEVELOPMENTS

CROSS-REFERENCE TO RELATED APPLICATIONS

The present application is a continuation-in-part application of U.S. patent application Ser. No. 08/933,545, filed Sep. 19, 1997, which is, in turn, a continuation-in-part of U.S. patent application Ser. No. 08/890,589, filed Jul. 9, 1997, which is, in turn, a continuation-in-part application of U.S. patent application Ser. No. 08/806,471, filed Feb. 26, 1997, the contents of all of these applications hereby being incorporated by reference.

BACKGROUND OF THE INVENTION

1. Field of the Invention

The present invention relates generally to a telecommunications system for providing a wireless local loop, the system including a fixed hardwire network platform having at least one Independent Central Office located within a new residential or commercial development and connected to the Public Switched Telephone Network (PSTN), at least one subscriber base station, and subscriber terminals communicating with the fixed network via a radio path.

2. Description of the Prior Art

The divestiture of American Telephone & Telegraph (AT&T) in 1984 resulted in the creation of seven Regional Bell Operating Companies ("RBOCs"). Since AT&T remained as purely a long distance carrier, the business of providing local telephone services came under the control of these seven RBOCs. After divestiture, the seven RBOCs (the "Incumbent Local Exchange Carriers" or "Incumbent LECS") owned all of the expensive "hardwire" infrastructure necessary to provide local telephone services and owned the local networks to which all of the long distance carriers ("IXCs") had to pay access fees in order to originate and terminate their customer's long distance calls. Since the RBOCs had not been required to freely allow competition for local telephone service in the local markets, to date no company has been successful in entering the estimated $100 billion Local Exchange Carrier ("LEC") market in the United States on a large scale, large scale being defined as including residential customers. Therefore, regarding the provision of local telephone services across the United States, the AT&T divestiture in 1984 basically replaced a national monopoly (AT&T) with seven geographic monopolies (RBOCs).

Despite the passage of the Telecommunications Act of 1996, the purpose of which was to effect significant competition in the LEC markets, the existing RBOCs, due to their overwhelming size and their ownership of the existing infrastructure, have to date been successful in inhibiting any significant competition in the LEC market since any new entrant into the market has only two options for the provisioning of local telephone services: (1) building new infrastructure which is prohibitively expensive, or (2) successfully negotiating contracts with the Incumbent LECs which require the payment of excessive fees to the Incumbent LECs in order to utilize the LEC infrastructure to resell local telephone services. Neither of these options is particularly appealing since either option substantially favors the RBOCs in the following ways:

1. There is currently no viable, cost effective alternative to the conventional "hardwire" platform to allow large scale competition in the LEC market on a national basis or even on a regional basis.

2. The costs to build a new infrastructure today are prohibitive. In a Wall Street Journal article dated Feb. 12, 1996, the costs of building such an infrastructure were projected at $5 billion to "get started" and $20 billion to "extensively penetrate the market." It has since become clear to the entire telecommunications industry that these projected costs were very low. In 1996, both AT&T and MCI announced strategic plans calling for large scale (including residential customers) building of local networks to compete with the Incumbent LECs. However, neither AT&T nor MCI has pursued these plans and both have admitted publicly that doing so, on a large scale, would not be economically feasible. On Jul. 14, 1997, the Wall Street Journal reported MCI's projected loss of $800 million in its attempt to build local networks in a number of metropolitan markets to begin to compete for local commercial accounts. This news caused MCI to lose $5 billion of market value in one day! Similarly, AT&T spent $4 billion on its efforts but reaped only $65 million in revenue in its unsuccessful attempt to enter the LEC market for residential services.

3. The RBOCs have enjoyed one of the highest operating cash flow margins of any U.S. industry, over double that of the IXCs. While the LEC business has remained "proprietary," the long distance business, with its increased competition, has become much more of a "commodity" business. AT&T has had its market share drop to 50% since 1984 and has had its average revenue per minute cut almost in half. Hence, AT&T and MCI are not in a position to "outspend" the RBOCs in infrastructure development.

4. The RBOCs have all filed to become long distance service providers ("IXCs"). In contrast to the plight of AT&T and MCI in their attempts to enter the LEC market, there are no costly infrastructure obstacles blocking entry of the RBOCs into the IXC market: the RBOCs can buy ready made networks from IXC providers at wholesale rates for immediate deployment. The RBOCs initially announced that their initial strategies regarding the provision of long distance services would be to resell, where discounts usually run about 80%. However, in contrast, the resale discounts the RBOCs originally intended to offer the IXCs for resale of local services were closer to 10–15%.

To ensure their own competitive survival, the IXCs must make inroads into the profitable LEC market. However, to date no technology has been proposed which would enable a company independent of the RBOCs to provide local telephone services at a competitive cost. None of the solutions requiring infrastructure investment is economically viable for the reasons noted above. There is thus a great need in the art for a system and method which would enable a company, independent of the RBOCs, to provide cost competitive local telephone services, and hence meaningful competition to the incumbent RBOCs in the LEC market, without requiring a cost prohibitive infrastructure investment.

Embodiments of the present invention have also been designed to meet another great need in the art, the need to significantly reduce the monopolistic access charges charged by the LECs on most long distance calls, charges which cost customers tens of billions of dollars each year. Most long distance calls must be originated through the LEC switch, and most calls are terminated by the LEC switch as well.

Therefore, access charges payable to the Incumbent LECs continue to be incurred. Specifically, with respect to outgoing calls placed from a subscriber location, the LEC switch which serves the subscriber's customer premises equipment senses an off-hook condition and extends dial tone. When the dialed digits are received in the LEC switch, any features associated with the originating subscriber, such as speed dialing, are applied to the call, and the call is then routed to the desired destination. If the call is a long distance call that is routed to a long distance or inter-exchange carrier (IXC), then the IXC will pay originating end and terminating end "access charges" to the LEC for servicing the call, and the subscriber will, in turn, pay the IXC for the total cost of the call.

Currently, the access charges paid to LECs by the IXCs for the use of carrier common line service vary by LEC but can constitute upwards of 40% of the overall cost of the call. Accordingly, eliminating the stranglehold the LECs have on the local market and their claims to the originating end access charges could save a significant percentage of the cost of a long distance call. Bypassing the LEC and the associated originating end access charges could also save the IXCs a significant portion of their service costs for providing long distance calls and, once the associated savings are passed on to their subscribers, potentially save their subscribers billions of dollars each year in long distance charges. Payment of such access charges remains a key issue in the telecommunications industry since the passage of the Telecommunications Act of 1996 and is one of the primary obstacles to enhanced competition between the LECs and other potential entrants into the local telecommunications marketplace. As a result, any long distance service provider who can bypass the LEC and avoid payment of the originating end access charges will be at a substantial competitive advantage. Not unexpectedly, the RBOCs are utilizing every possible means to protect their access charge monopoly, and hence, have currently tied up the implementation of certain provisions of the Telecommunications Act of 1996 in district court litigation.

One proposal for bypassing the LECs is to implement fixed wireless technologies for local services. For example, IXCs have proposed to enter the local telephone market by implementing fixed wireless local loop systems such as "Project Angel" announced by AT&T in February, 1997. However, to date, such systems have not been implemented in the residential marketplace because of the prohibitive deployment costs and lack of a technology solution that would reduce these costs. "Project Angel," in particular, has yet to be implemented, and it has been reported that unless deployment costs are brought down significantly from where they are today to make Project Angel an economically viable local service option, it will not be implemented. To date, efforts by the IXCs to compete for local services have concentrated on providing digital cable and fixed wireless networks primarily to the local business market where the deployment costs per telephone line are significantly lower and the revenues generated are substantially higher than for residential customers. However, AT&T has announced a merger with TCI, a major cable company, indicating a possible shift to the use of cable lines to provide local telephone service to residential customers. Such changes in strategy have become necessary because the deployment costs of alternative technologies such as fixed wireless local loop systems simply have been found to be too great to build a competitive infrastructure to compete against the established Incumbent LECs for the telephone services of suburban and rural customers. The present invention specifically addresses the needs of these residential customers.

The plunging costs of cellular telephone services have compounded the problem facing those considering building infrastructure to implement fixed wireless local loop telephone services. In fact, IXCs AT&T and Sprint have aggressively attempted to move customers to their own digital wireless (cellular or PCS) services because the deployment costs for Project Angel and other fixed wireless local loop systems have made fixed wireless systems a less desirable alternative. Indeed, if the deployment costs for fixed wireless local loop systems cannot be brought down, IXCs such as AT&T have indicated that they will likely have to drop their plans for fixed wireless local loop systems.

Accordingly, a system is desired which will enable the cost-effective implementation of a fixed wireless local loop system which is independent of and cost competitive with the LECs and which preferably provides access to at least some portions of the residential local telephone market. The present invention has been designed to meet this great need in the art.

SUMMARY OF THE INVENTION

The present inventor has met the above-mentioned needs in the art by creating a new telecommunications network platform for providing a wireless local loop service, including a fixed hardwire network platform having at least one Independent Central Office located within a new residential or commercial development and connected to the Public Switched Telephone Network (PSTN), at least one subscriber base station, and at least one subscriber terminal communicating with the fixed network via a radio path. Each subscriber terminal includes a radio transceiver, a power source with a battery backup unit, a measurer for measuring the signal level and signal quality on the radio path between the base station, a subscriber terminal, and an antenna system constructed to broadcast and receive spread spectrum electromagnetic signals such as code division multiple access (CDMA) and time division multiple access (TDMA). Those skilled in the art will appreciate that the techniques described herein permit the cost effective creation of a hardwire platform of infrastructure and Independent Central Offices (COs) for use in implementing a fixed wireless local loop in many areas throughout the United States.

The present invention allows the subscriber to bypass the LEC by connecting to such a hardwired Independent Central Office for local services and for long distance services by utilizing existing tariffed network services and existing tariffed commercial DID/DOD services. The LEC bypass is accomplished utilizing existing technology within the LEC's tariffed equipment which effectively permits a plurality of subscribers to share DS1 (T1) lines for their Central Office services and long distance calling. In accordance with the invention, a hardwire connection is established between the Independent Central Office, the LEC, and the IXC, and a fixed wireless local loop connection is established between the Independent Central Office and the customer premises. These connections allow the subscriber to "bypass" the LEC switching equipment and thus do not require the involvement of the LEC's tariffed voice switch and the associated access charges.

In accordance with the invention, the Independent Central Office comprises telephone switching equipment such as a private branch exchange ("PBX") connected between the LEC T1 line and a local telephone network managed by the Incumbent LEC. The Independent Central Office may also comprise a channel service unit connected to the LEC T1 line and a DS1 conversion card connected between the telephone switching equipment and the channel service unit.

Alternatively, a D4 multiplexer may connect the channel service unit to at least one analog trunk within the telephone switching equipment, where the D4 multiplexer comprises a converter which converts analog voice signals from the analog trunk to digital signals for application to the channel service unit.

The D4 multiplexer may be located at a location remote from the CO of the Incumbent LEC (such as in a new residential housing or commercial development) and housed in a weatherproof housing at or near the subscriber's premises. Also, the telephone switching equipment of the Independent Central Office is preferably located in a new residential housing development (single detached, attached, or multi-family) or in a new commercial development and used to provide local and long distance calling services, as well as Internet access and other telecommunications services, to the residents of the residential housing development or to the tenants of the commercial development. The long distance service is provided as described above, while the local service within the development, as well as local service via the PSTN, is provided via DID/DOD trunks purchased from the LEC and unbundled for use by the residents in the residential development or tenants in the commercial development.

Since this Independent CO platform is provided in new service areas not presently serviced by the Incumbent LECs, new infrastructure may be purchased which is not in direct competition with that provided by the Incumbent LECs. Then, the new infrastructure may be connected into the existing PSTN at tariffs substantially below the tariffs of conventional residential voice lines, thus permitting the cost savings for the community's residents which make the technique of the invention economically viable.

In accordance with the present invention, since the Independent Central Office provides a platform for the provision of a complete package of local and long distance services independent of the LECs, and since the platform provided in the new residential and commercial developments may be readily connected to customer premises using fixed wireless techniques, the Independent Central Office in each housing development can provide a cost-effective fixed wireless platform which is financially supported by the residents of that new residential or business community. Therefore, the fixed wireless local loop system may be implemented in a cost-effective manner because it is using a basically "prepaid" platform for backhaul and inter-connection, which represents about two-thirds of the cost for providing fixed wireless services. In effect, the only significant additional infrastructure cost would be the addition of a wireless base station at the Independent Central Office and the addition of a radio tower and antenna system. Customer premises in the region would have radio transceivers for communication with the radio tower and hence the Independent Central Office. The LEC bypass operates in the same manner for the fixed wireless local loop customers as it would for the customers in the residential development serviced by the Independent Central Office or the outdoor D4 multiplexer.

BRIEF DESCRIPTION OF THE DRAWINGS

The objects and advantages of the invention will become more apparent and more readily appreciated from the following detailed description of the presently preferred exemplary embodiments of the invention taken in conjunction with the accompanying drawings of which.

DETAILED DESCRIPTION OF PRESENTLY PREFERRED EMBODIMENTS

A method and system for creating a hardwire platform for a fixed wireless local loop and an Independent Central Office (CO) in a new residential housing development or new commercial development in accordance with the presently preferred exemplary embodiments of the invention will be described below with reference to FIGS. 1–8. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

TELEPHONE SERVICES PLATFORM FOR NEW DEVELOPMENTS

Figure 1:
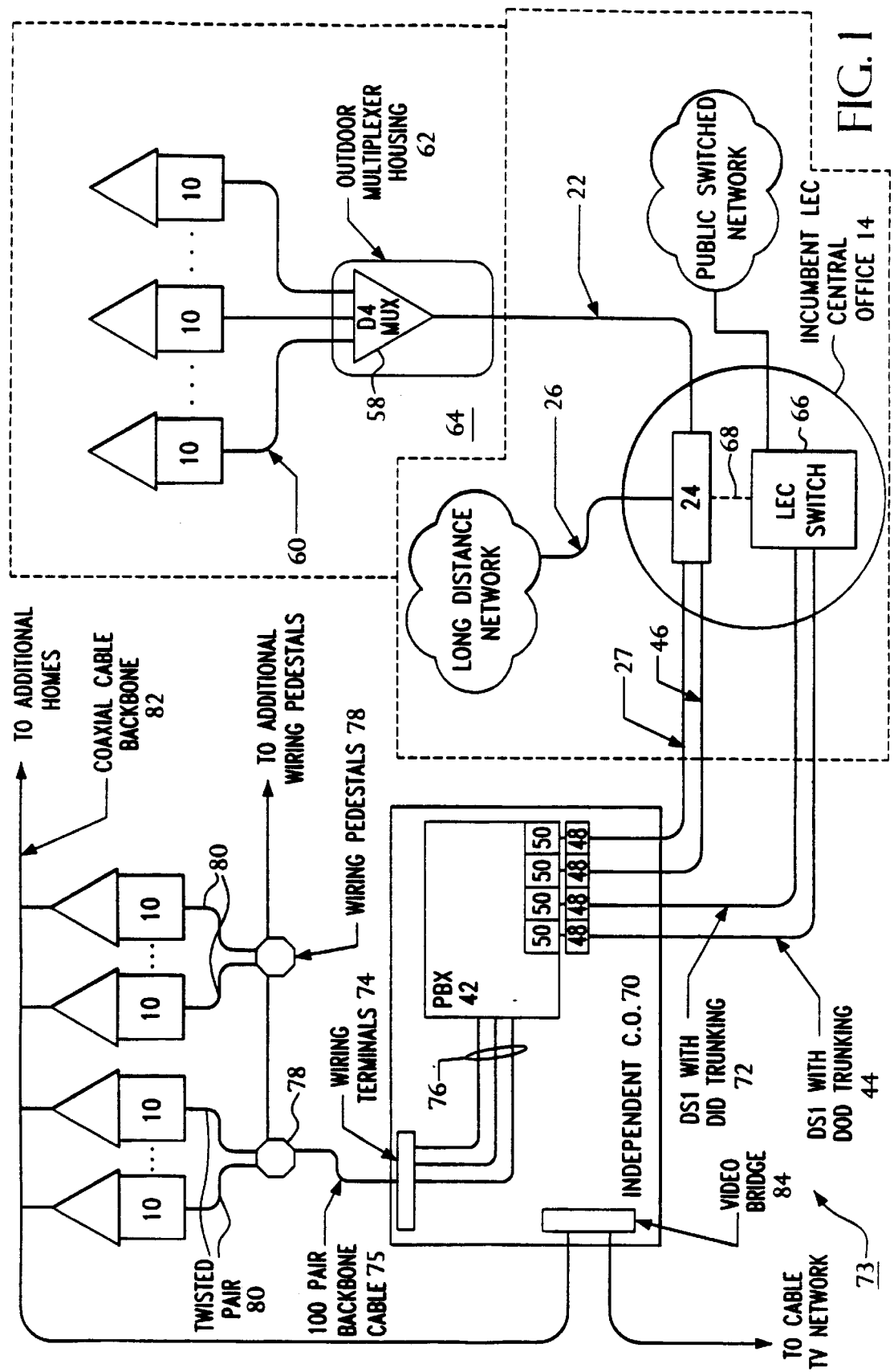
FIG. 1 illustrates the hardwire connection between an Independent Central Office in a new residential housing development, the subscriber premises, and the Incumbent LEC Central Office in accordance with the invention.

In the embodiment of the invention illustrated in FIG. 1, the privately owned stand alone D4 multiplexers 58 are placed in new residential housing developments (single detached, attached, or multi-family) or new commercial developments 64, as indicated by dotted line in FIG. 1. In accordance with the invention, new copper wire or twisted pair cable 60 is laid from the D4 multiplexers 58 to each new home during construction but control of these lines is not relinquished to the Incumbent LEC when construction is completed.

The D4 multiplexer 58 is preferably contained in an environmentally protected, climate controlled, vandal proof housing 62 suitable for outdoor use on the premises of the new residential or new commercial development 64. The housing 62 preferably contains two RJ-48S interfaces, two CSU cards, and up to forty-eight Nx56/64 voice/data card slots. The slot types are preferably universal in nature and adapted to accommodate FXS, E&M, Office Channel Unit Data Port (OCUDP), OPX, and NT1 interfaces. Housing 62 preferably mounts directly onto a concrete slab with two one inch conduit ducts (Network Interface and 120 VAC) and one four inch conduit duct (Customer Side Interface). The Customer Side Interface (CSI) preferably has an access panel allowing easy access to at least two 48 pin punchdown blocks. A fully redundant Uninterruptible Power Supply (UPS) system with at least a four hour backup is also provided.

The D4 multiplexers 58 may be independently controlled by an independent telecommunications service company to provide long distance services via T1 line 22, DEXCS frame 24, and T1 line 26 using the techniques described above. Access to the PSTN for local service could continue to be provided by the Incumbent LEC Central Office 14 by connecting the DEXCS frame 24 directly to the Incumbent LECs switch 66, such as the 5ESS or DMS1000 tariffed for voice services, via T1 line 68. However, in this case, the customer only receives cost savings for long distance services; LEC local service charges would continue to be charged for access to the LEC switch 66.

On the other hand, savings for local as well as long distance services may be provided to the customers of the new development 64 in accordance with the invention by further providing an Independent Central Office facility 70 of the type illustrated in FIG. 1. Independent Central Office 70 contains a switch 42 such as a private branch exchange ("PBX") including Channel Service Unit cards 48 and DS1 cards 50. Access to the long distance network is preferably provided by the switch 42 by connecting an incoming call on incoming T1 line 27 to outgoing T1 line 46 for connection to the long distance network via DEXCS frame 24 and T1 line 26. However, in accordance with the invention, access to local services may also be provided without payment of conventional LEC local service charges for residential voice service by providing Direct Inward Dialing (DID) across digital high capacity trunk lines 72 and Direct Outbound Dialing (DOD) across digital high capacity trunk lines 44 purchased by the Independent Central Office 70 from the Incumbent LEC Central Office 14.

Those skilled in the art will appreciate that DID and DOD across digital high capacity lines provides at least an 8:1 ratio of subscribers to lines. DID numbers are assigned Automatic Number Identification (ANI) codes from the Incumbent LEC, which is currently a tariffed commercial service, substantially less per minute than tariffed residential customer voice service. When a DID number is dialed from within the PSTN, it is routed to an available channel on the PBX 42, which, in turn, picks up the ANI code and switches the call to the terminating station line (subscriber), who may be a subscriber in new development 64 or a subscriber in new development 73 (described in more detail below). On the other hand, calls originating within the subscriber houses 10 serviced by the Independent Central Office 70 are provided to the LEC switch 66 via DOD trunk lines 44. Those skilled in the art will appreciate that this arrangement is similar to a corporate PBX environment where such a ratio of lines to subscribers is commonly used. However, those skilled in the art will further appreciate that such facilities have not previously been provided to residential customers in a residential neighborhood as proposed herein with the substantial cost savings to residential subscribers.

To put the cost savings in perspective, it is noted that 150 residential subscribers may be serviced by 150/8=19 inbound/outbound lines, whereby the Independent Central Office 70 need only purchase 19 inbound/outbound lines from the Incumbent LEC 14 but may sell 150. Moreover, the 19 inbound/outbound lines purchased from the Incumbent LEC 14 are tariffed at the lower commercial DID/DOD rate than the typical residential voice rate, resulting in significant additional cost savings.

Conventionally, DID/DOD digital trunk service purchased from the Incumbent LEC 14 allows a customer (in this case, the Independent Central Office 70) to use a DS1 (1.544 Mbps) facility to transport PBX type services, including Direct Inward Dialing (DID), Direct Outward Dialing (DOD), Wide Area Telecommunications Service (WATS), or Custom 800 service from a wire center (Incumbent LEC 14) specified by the customer to their premises. The wire center must be within the same Local Access and Transport Area (LATA) as the customer location but does not have to be the normal serving wire center. As noted above, this service provides a cost effective method of delivering switched exchange access service via a DS1 facility. It also provides the subscriber with a digital handoff of the many PBX type services previously unavailable to residential subscribers, which services can terminate directly into the PBX 42 of the Independent Central Office 70. This direct interface provides the customer with significant customer premise equipment cost savings while also providing the many PBX features at little or no additional cost.

Typically, a DID/DOD arrangement provides for the equivalent of 24 exchange access lines between a wire center and the PBX 42 of the Independent Central Office 70. These 24 channels may be used as trunk lines to PBX equipment 42 as proposed, and may provide DID, DOD, WATS, or Custom 800 service. Typically, the monthly charge for such Digital Trunk Service includes 24 services; however, the Independent Central Office 70 does not have to turn on all 24 services at the same time. In addition, all DID and DOD service may be provided directly from the trunk side of a digital Incumbent LEC Central Office switch 66. In an analog Incumbent LEC Central Office 14, on the other hand, a multiplexer must be used to convert the analog signals to digital signals. The use of the DS1 to transport the DID service to the customer end does not change the way DID works without the DS1, nor does it allow other features that would not be currently offered under the tariff.

Those skilled in the art will appreciate that DID service allows incoming calls to PBX 42 from the PSTN to go directly to a specific station line at a subscriber residence so that a PBX attendant is unnecessary. Such DID service, without outward dialing capability, uses one-way, incoming trunks. DID phone numbers must be ordered in multiples of 100, where each station is assigned an individual telephone number.

In the embodiment of FIG. 1, the D4 Multiplexer 58 and the Independent Central Office are preferably built in new residential developments and commercial developments while the developments are under construction so that it is not necessary to obtain additional telephone right-of-ways and the like for laying phone lines or cables. Preferably, the Central Office 70 and D4 Multiplexer 58 are part of the design plans for the new development and are constructed as the development is being built. As shown in FIG. 1, a small housing development in a particular LATA may simply use a D4 multiplexer 58, while a larger housing or commercial development 73 in that same LATA may instead include an Independent Central Office 70.

The D4 Multiplexer 58 allows T1 lines purchased from the Incumbent LECs to be used to connect small developments 64 to the Independent Central Office 70 without having to run cable to, or buy a switch for, the small developments. In effect, the D4 Multiplexer 58 allows the switching services of the Independent Central Office 70 to be extended using tariffed T1 service so that it remains cost effective to service small developments using the techniques of the invention. On the other hand, large housing development 73 may be served directly by on-site Independent Central Office 70, where local service is provided from the Incumbent LEC Central Office 14 via DID trunk 72 and DOD trunk 44 as in a conventional office environment. Long distance service, on the other hand, is provided via DEXCS frame 24 using the LEC bypass techniques described in the afore-mentioned parent applications. In addition, the D4 multiplexer 58 could be linked to the PBX 42 using a wireless link of the type described below with respect to FIGS. 4–8.

The Independent Central Office 70 connects to the homes 10 within the new residential housing (single detached, attached, or multi-family) development 73 via punch down blocks or wiring terminals 74, which function to separate out the respective twisted pairs of a 100 pair backbone cable 75 servicing the development 73 and to connect the respective twisted pairs to respective ports 76 of the PBX 42. 100 pair backbone cable 75 connects respective outdoor weatherproof wiring pedestals 78 within the housing development 73, which, in turn, terminate a plurality of twisted pairs 80 into respective subscriber homes 10. As noted above, backbone cable 75 and twisted pairs 80 are preferably laid in the virgin ground during the building of the housing development 73 so as to eliminate all right-of-way concerns and to minimize infrastructure costs. The Independent Central Office 70 is preferably built during the building of the housing development 73 and subsequently used to manage, in addition to local and long distance calling services, cable television and other services provided to the housing development 73 via coaxial cable backbone 82 and any other high capacity data line laid in the telephone lines right-of-way. For example, the coaxial cable backbone 82 can be laid using the same right-of-ways as the telephone lines and similarly terminate at the Independent Central Office 70 for connection to a cable television network via a video bridge (amplified splitter) 84. In this fashion, the telephone service company for the developer, via the Independent Central Office 70, may maintain control of all cable television and telephone services provided to housing development 73. Also, a high capacity data line may be laid in the same right-of-way and managed by the Independent Central Office 70 to provide a plurality of data services to the residential housing development 73. Of course, a new commercial development could be wired in similar fashion.

Once the new residential housing (or commercial) development 73 with Independent Central Office 70 is wired as shown in FIG. 1, local telephone service is ordered from the Incumbent LEC Central Office 14 as follows.

Step 1: Identify the location of the Independent Central Office 70 and the location of the serving wire center (Incumbent LEC Central Office 14) for the DS1 facility.

Step 2: Identify the type of Central Office the DS1 will terminate in. An analog Central Office will require a multiplexer, while a digital Central Office requires a multiplexer except for DID.

Step 3: Identify the type and quantity of services to be ordered (DID/DOD).

Step 4: Determine the channel number assignments (blocks of 100).

Step 5: Identify the type of PBX used (e.g., Lucent Definity G3 PBX) and the terminating equipment at the Independent Central Office (e.g., CSU 48).

Step 6: Provide the information gathered in steps 1–5 to the Incumbent LEC to place the order for DID/DOD service.

Step 7: When the DS1 line is installed by the Incumbent LEC, install the DS1 card into the PBX 42.

Step 8: Program the PBX's translation table to assign the telephone numbers to the subscriber lines (DID), including subscribers serviced via certain D4 multiplexers 58 in that LATA.

Step 9: Program all local outbound traffic to route through the DS1 (DOD) line 44.

Outbound calls from and inbound calls to subscribers 10 in residential community 73 via Independent Central Office 70 will now be described with respect to FIGS. 2 and 3, respectively.

Figure 2:
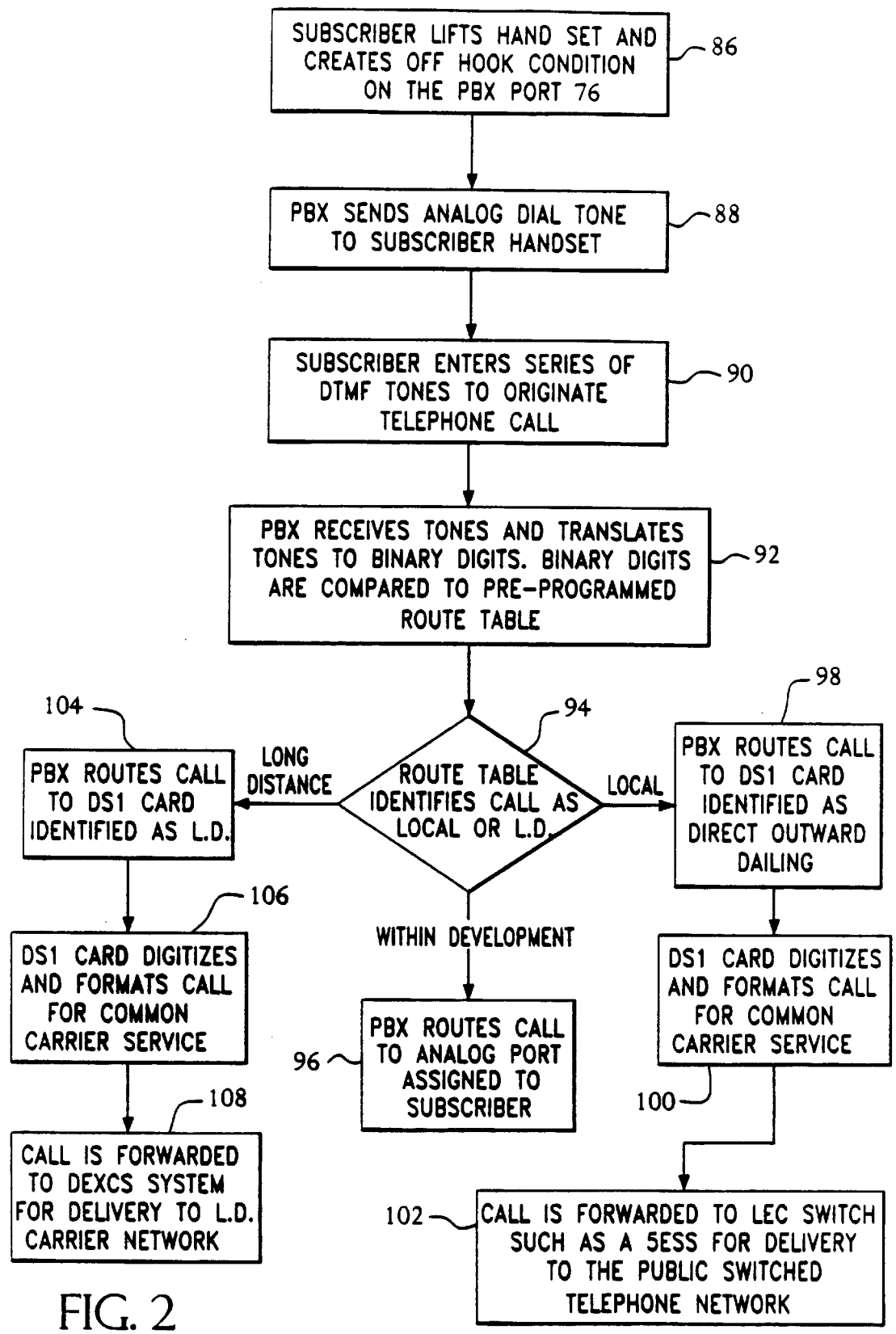
FIG. 2 illustrates the flow of an outbound call from a subscriber's premise in the new residential housing development of the embodiment of FIG. 1.

As shown in FIG. 2, subscriber 10 in residential community 73 begins a call at step 86 by lifting a hand set and creating an off hook condition on a port 76 of PBX 42. The PBX then sends an analog dial tone to the subscriber's hand set at step 88. Upon receipt of dial tone, the subscriber enters the desired phone number at step 90 as a series of DTMF tones to originate the telephone call. At step 92, the PBX 42 receives the DTMF tones and translates them to binary digits in a conventional manner. The binary digits are then compared to the pre-programmed route table in the PBX, and at step 94, the route table identifies the call as a local call within the development, as a local call outside the development, or as a long distance call. If the call is a local call within the development, the PBX 42 routes the call at step 96 to the analog port 76 assigned to the designated subscriber as in a conventional PBX office setup. On the other hand, if the call is a local call outside the development, at step 98 the PBX 42 routes the call to the DS1 card provided for DOD, where the DS1 digitizes and formats the call for common carrier service at step 100. The call is then forwarded at step 102 to the Incumbent LEC switch 66, such as a 5ESS, via DS1 trunk line 44 for delivery to the PSTN. However, if the route table identifies the call at step 94 to be a long distance call, at step 104 the PBX 42 routes the call to the DS1 card provided for long distance, where that DS1 digitizes and formats the call for common carrier service at step 106. The call is then forwarded at step 108 to the DEXCS frame 24 at the Incumbent LEC Central Office 14 via DS1 line 46 for delivery to the Long Distance Network.

Calls are originated by a subscriber 10 in new housing development 64. Once the call is received via DS1 line 27 by the PBX 42, the call is evaluated as described above with respect to steps 94–108.

Figure 3:
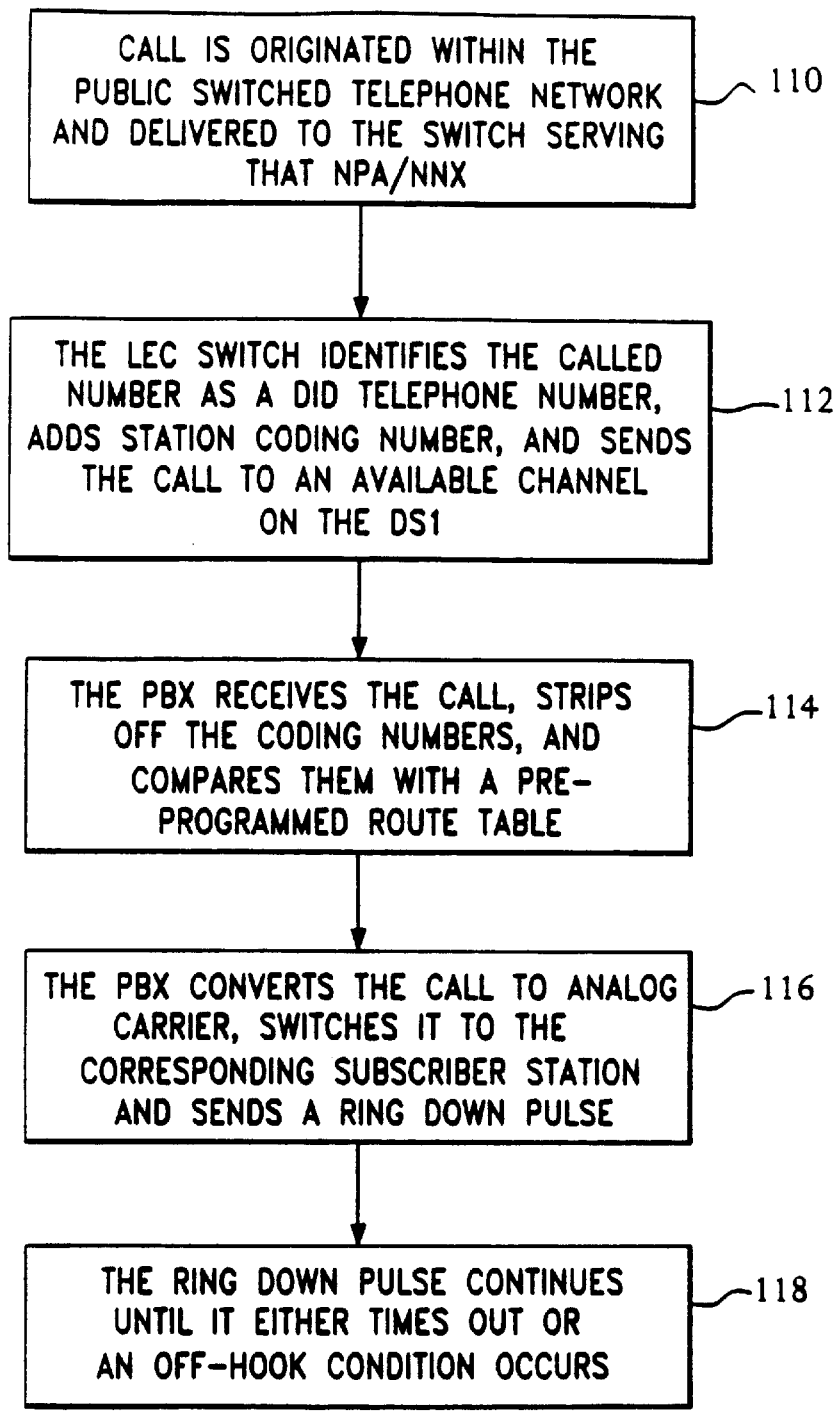
FIG. 3 illustrates the flow of an incoming call to a subscriber's premise in the new residential housing development of the embodiment of FIG. 1.

Incoming calls to a subscriber 10 in new housing development 73 are handled as illustrated in FIG. 3. In particular, a call originated within the PSTN designating the prefix for Incumbent LEC switch 66 is delivered at step 110 to Incumbent LEC switch 66 in a conventional manner. At step 112, the Incumbent LEC switch 66 identifies the called number as a DID telephone number, adds station coding numbers, and sends the call to an available channel of the DS1 trunk line 72 to the PBX 42. At step 114, PBX 42 receives the call, strips off the coding numbers, and compares them with the pre-programmed route table in the PBX 42. At step 116, the PBX 42 converts the call to analog carrier, switches the call to the corresponding subscriber station, and sends a ring down pulse. Then, at step 118, the ring down pulse continues until it either times out or an off-hook condition occurs.

Calls to a subscriber 10 in new housing development 64 are routed using conventional techniques. Once the call is received via DS1 line (DID) 72 by the PBX 42, the call is evaluated as described above with respect to steps 94–108 and routed to the subscriber 10 via outgoing DS1 line 46, DEXCS frame 24, DS1 line 22, D4 Multiplexer 58, and lines 60 to subscriber 10 in new development 64.

As so described, the hardwire telephone platform of the invention substantially differs from the prior art in that an Independent Central Office is provided which can provide local and long distance services in competition with the Incumbent LECs while providing no infrastructure other than that for a new community, which would have to be added in any case. In particular, the wiring system of the invention uses twisted pair, coaxial cable, and/or another form of medium to provide potential broadband services, all of which are installed during an early phase of construction in a new residential housing (single detached, attached, or multi-family) or a new commercial development. For large developments, the Independent Central Office is provided in a building or some other facility erected within the development to house the head end electronics and to provide an interface to the PSTN. For smaller developments, a private D4 multiplexer is provided which connects into an Independent Central Office within that LATA.

At present, it is contemplated that the access fees currently paid to the Incumbent LEC would instead be under the control of a telecommunications service company for the developer who put the Central Office into the new residential or commercial development. Since the access fees would thereby be removed from LEC control, the IXC could negotiate a separate deal with the developer's telecommunications service company at rates which would, through natural competition, dramatically lower the per minute cost of long distance service, thereby yielding a tremendous competitive advantage over existing long distance competitors required to continue to pay the relatively high access fees to the Incumbent LECs. Alternatively, and preferably, the local and long distance service would be provided solely by the telecommunications service company for the developer. Also, since local service would be provided via tariffed commercial DID/DOD services rather than tariffed residential voice services, local access to the PSTN could be provided by the telecommunications services company with increased functions and lower costs.

Utilizing the Independent Central Office as a wire line or wireless telecommunications platform, a plurality of services including local, long distance, Internet access, and security monitoring can be provided. Additionally, those skilled in the art will appreciate that this Central Office platform, in conjunction with a coaxial cable backbone or in conjunction with an additional high capacity data line laid in the same right-of-way, may provide the bandwidth to make possible these additional services: pay-per-view movies, interactive video games, interactive education, video telephony, video conferencing, electronic banking, environmental monitoring, utility monitoring, video surveillance, card access monitoring, bulletin board services, fax services, printing services, and customized electronic news. Further cost savings in implementing these features may be obtained by fully automating each Independent Central Office monitoring facility and remotely controlling the Independent Central Office facility from a regional monitoring facility. In addition, all data for billing and service charges may be captured by the on-site electronics in a conventional manner and forwarded to a central processing point for dissemination and bill generation independent of the Incumbent LECs.

The private PBX platform of the invention permits a number of system enhancements. For example, the PBX may incorporate an enterprise communications server application which will allow voice, data, video, wireless, and other types of communications between end-points such as voice terminals, data terminals, computers, transceivers, and the like. The PBX may also support both analog and digital formats in both voice and data applications. In addition to station connectivity, the PBX may also support a wide number of interfaces including X.25, RS-232, Contact interfaces (analog line circuits for connecting the system to analog devices), and Network Interfaces (analog or digital interfaces, such as Central Office DID, DOD, common trunking, analog measured service, and ISDN basic and primary rate interfaces).

TELEPHONE SERVICES PLATFORM FOR FIXED WIRELESS LOCAL LOOP

Figure 4:
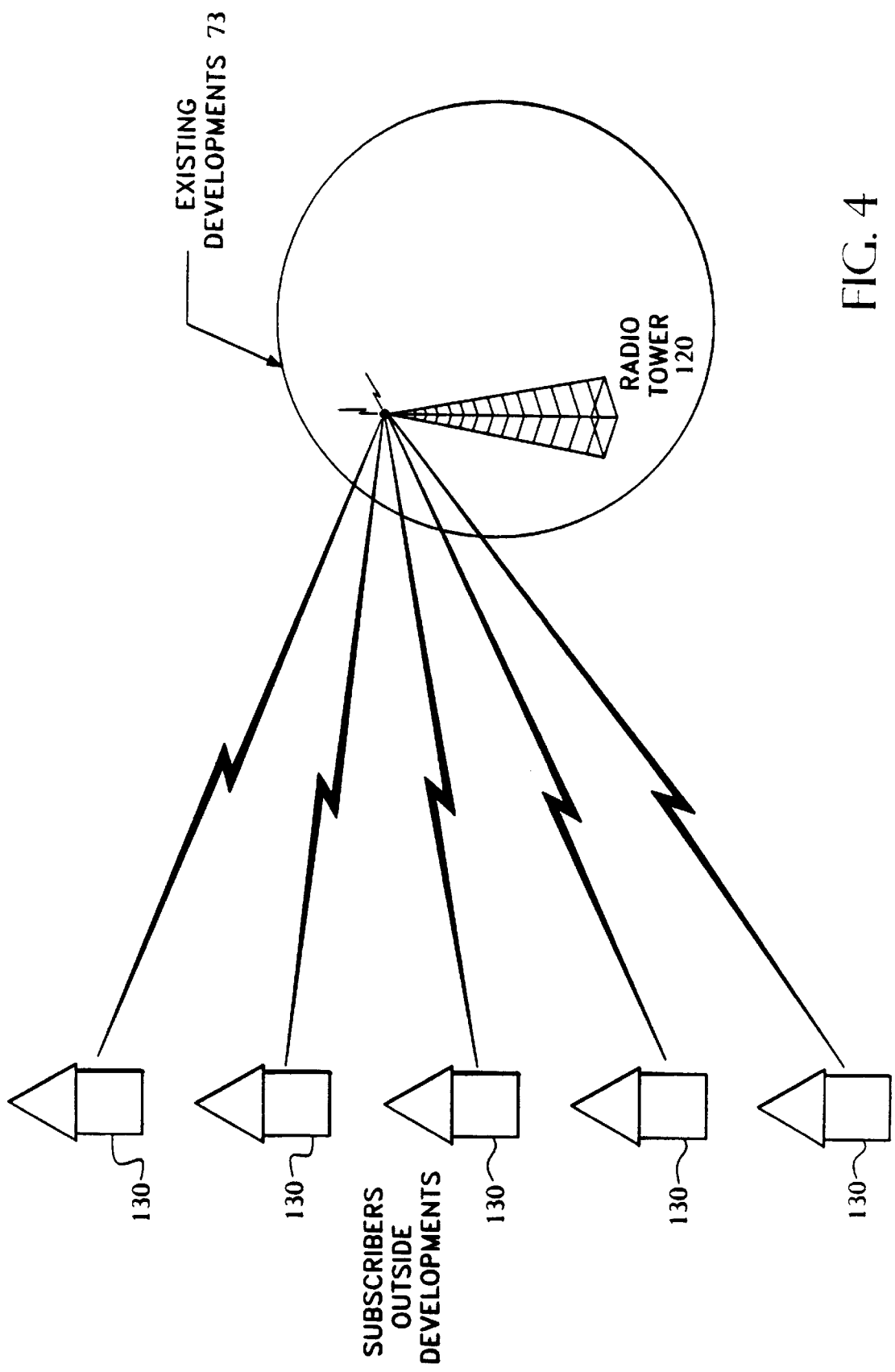
FIG. 4 illustrates the use of the Independent Central Office of FIG. 8 as a platform for extending local telephone service to subscribers outside the new residential housing development in accordance with a currently preferred embodiment of the invention.

Through the use of standard protocols, such as those commonly used on Local Area Networks (LANs) to connect nodes to an enterprise network, a wireless connection can be established such as described in U.S. Pat. No. 5,446,736 to allow the extension of the communication platform of FIG. 1 beyond the range of the new developments as described herein. FIG. 4 illustrates the use of the Independent Central Office 70 of FIG. 1 as a platform for extending local telephone service to subscribers outside the new residential housing development 73 illustrated in FIG. 1 using fixed wireless technology. As known to those skilled in the art, fixed wireless is a point to point radio spectrum technology which connects one fixed point with another fixed point. Generally, as shown in FIG. 4, where like numbers represent like elements from the above embodiments, fixed wireless may be implemented by adding a radio tower and antenna system 120 for transmitting/receiving fixed wireless local loop transmissions to/from subscribers 130 outside of the development 73. The fixed wireless transmission technology may be any commercially available technology with a suitable range and deployment cost.

Figure 5:
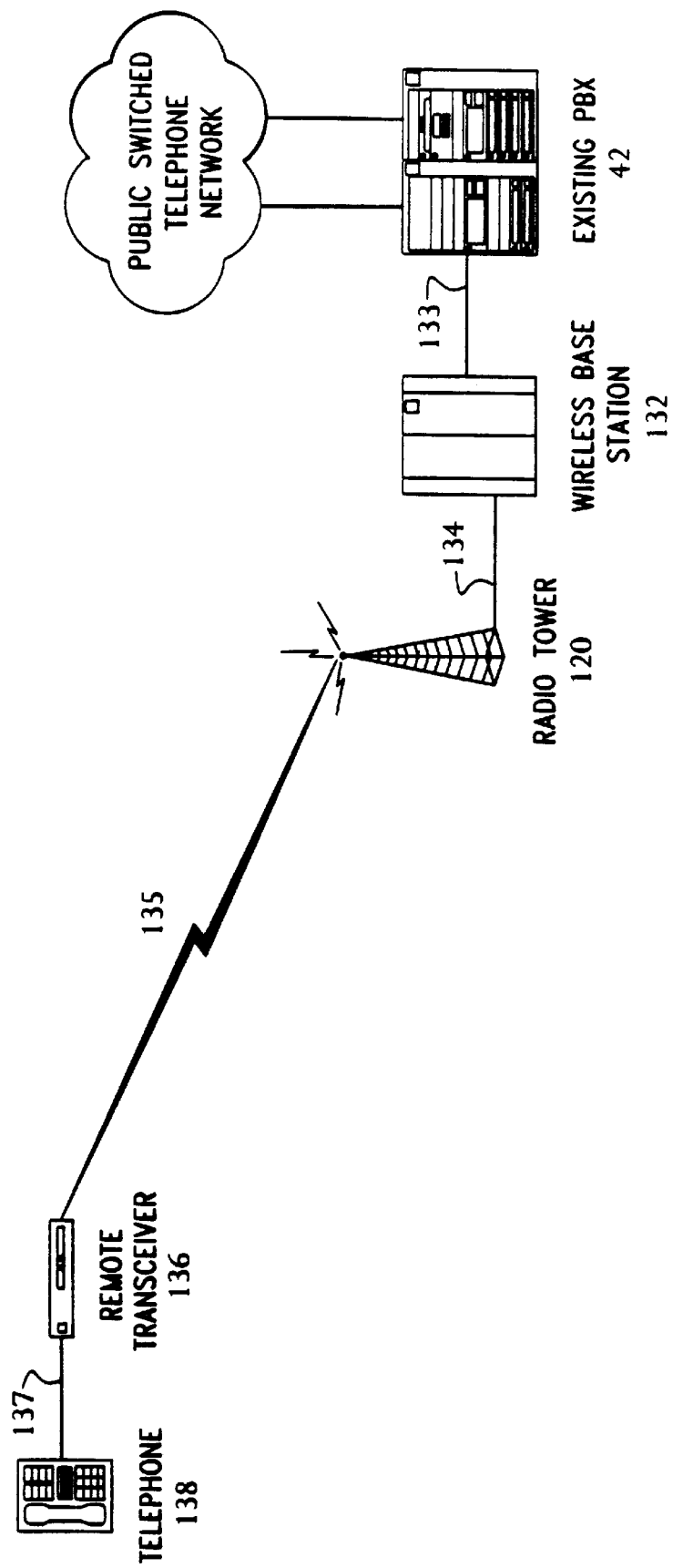
FIG. 5 illustrates the wireless path between an Independent Central Office in a new residential housing development, as in FIG. 1, and the subscriber premises in accordance with the invention.

FIG. 5 illustrates in more detail the wireless path between the hardware at the Independent Central Office 70 and the subscriber premises in accordance with a preferred embodiment of the invention. As shown, the PBX 42 at the Independent Central Office is connected to the PSTN as in the embodiment of FIG. 1. However, in this embodiment, a wireless base station 132 is connected to the PBX 42 via a T-carrier system or higher connection 133 and to the radio tower and antenna system 120 via connection 134. Radio tower and antenna system 120 communicates to remote subscriber premises 130 via a wireless link 135 using conventional CDMA, TDMA, AMPS, PCS, or other wireless techniques. The transmitted signal is received at the subscriber premises 130 using a remote transceiver 136 connected via a standard twisted pair cable 137 to a subscriber handset 138. Preferably, each remote transceiver 136 includes a power source with a battery backup unit, a measurer for measuring the signal level and signal quality on the radio path between the wireless base station 132 and the remote transceiver, and an antenna system constructed to broadcast and receive spread spectrum electromagnetic signals such as code division multiple access (CDMA) and time division multiple access (TDMA).

Figure 6:
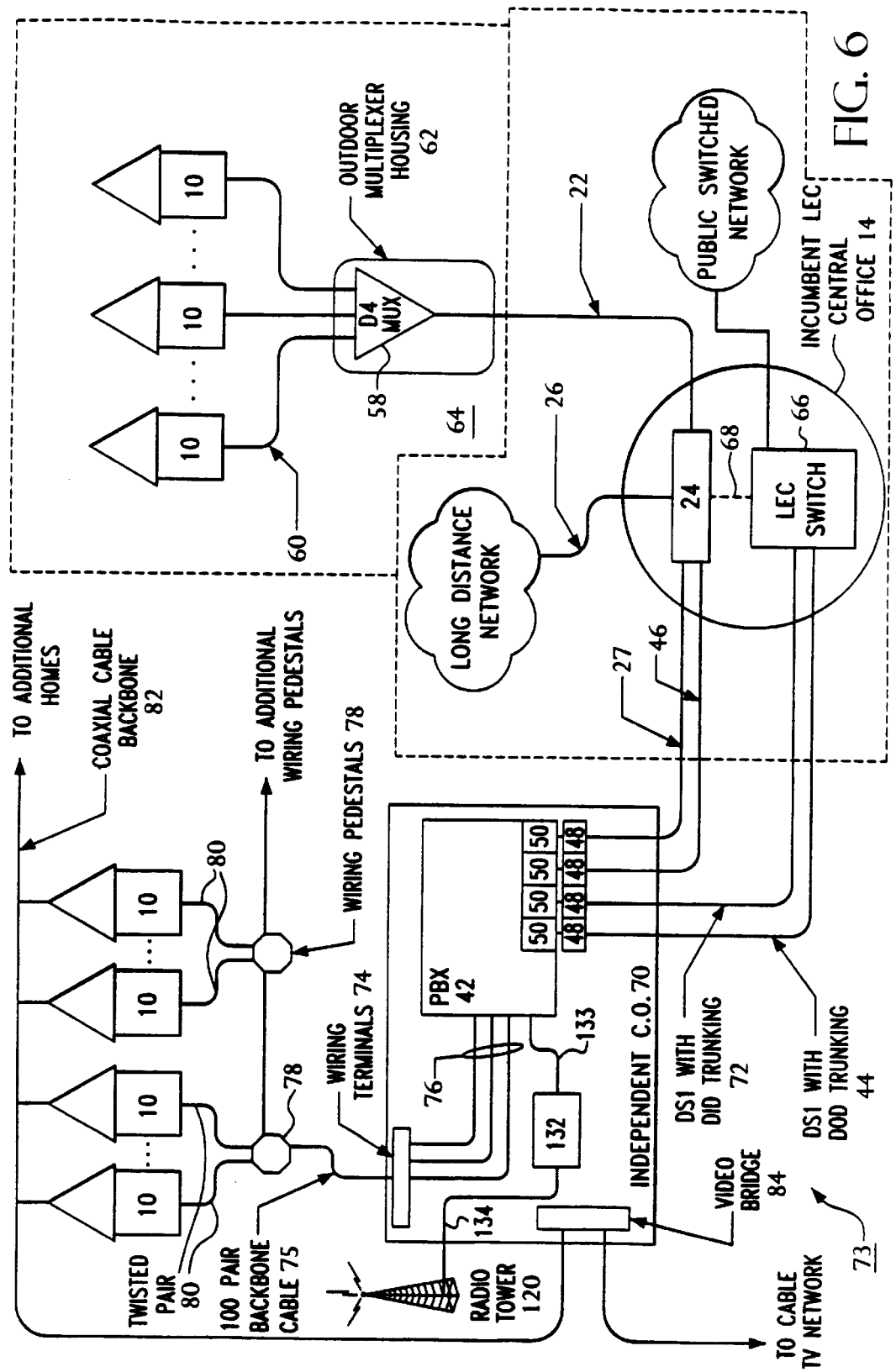
FIG. 6 illustrates the hardwire connection between an Independent Central Office in a new residential housing development, the subscriber premises, the Incumbent LEC Central Office, and the wireless base station for servicing subscribers outside of the new residential housing development in accordance with the invention.

FIG. 6 illustrates the hardwire connection between the Independent Central Office 70 in a new residential housing development 73, the subscriber premises 10, the Incumbent LEC Central Office 14, and the wireless base station 132 for servicing subscribers 130 outside of the new residential housing development 73 in accordance with the invention. In other words, FIG. 6 illustrates how the Independent Central Office 70 of FIG. 1 or a conventional Central Office operated independent of the Incumbent LEC may be modified for use as a platform for fixed wireless local loop services in accordance with the invention. Such modification may occur at the time the Independent Central Office is constructed, or alternatively, the wireless base station 132 and radio tower 120 may be added at a later date as desired. Once the wireless base station 132, radio tower 120, and the other connections of FIG. 6 are in place, local telephone service may be ordered by the telecommunication service company of the developer from the Incumbent LEC Central Office 14 as described above.

Outbound calls from and inbound calls to wireless subscribers 130 via the fixed wireless platform connected to Independent Central Office 70 in accordance with the invention will now be described with respect to FIGS. 7 and 15, respectively.

Figure 7:
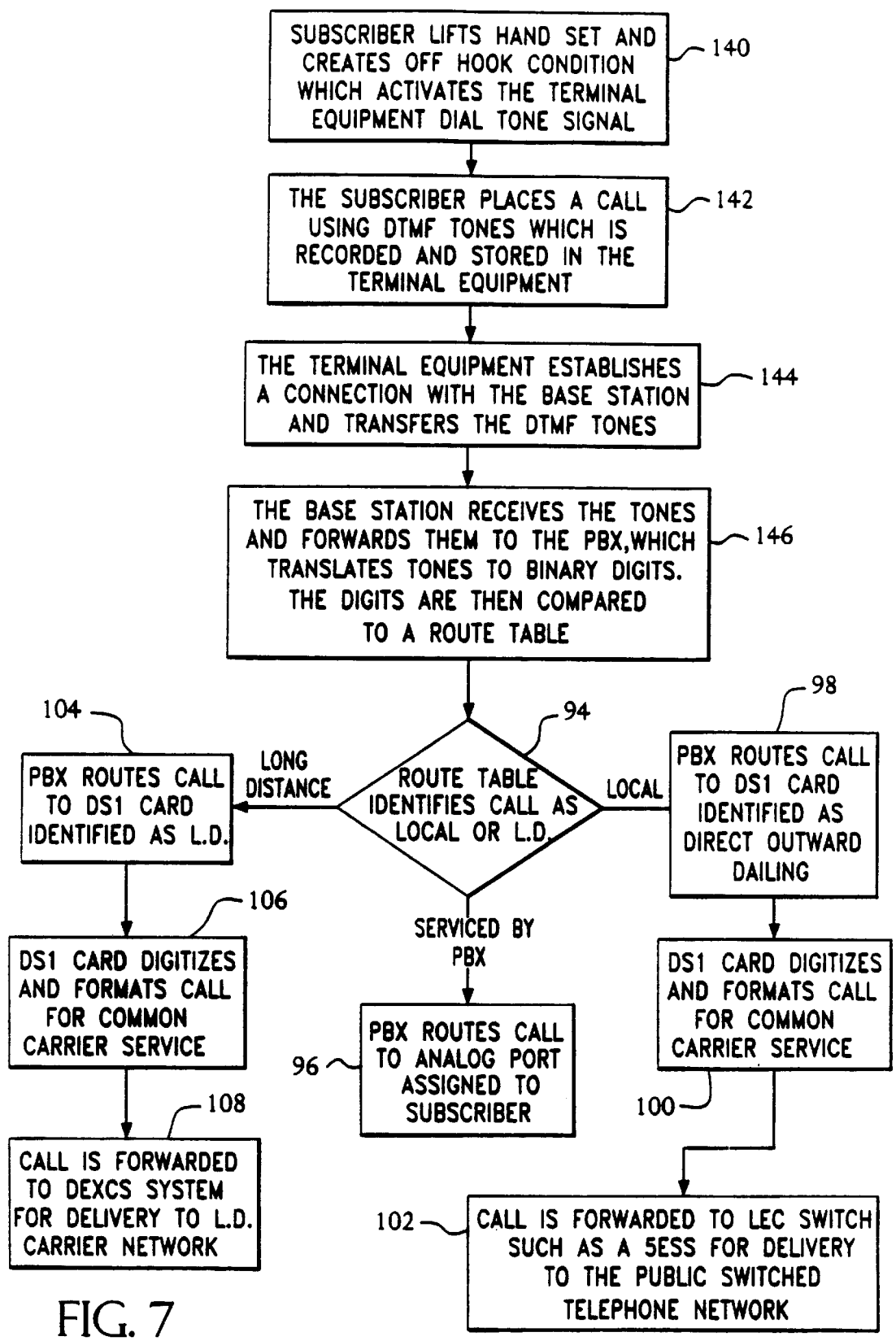
FIG. 7 illustrates the flow of an outbound call from a subscriber's premise outside the new residential housing development using fixed wireless local loop technology in accordance with the embodiment of FIG. 6.

As shown in FIG. 7, wireless subscriber 130 begins a call at step 140 by creating an offhook condition by lifting the handset of telephone 138 which causes the remote transceiver 136 to generate a dial tone signal to the telephone 138 via standard twisted pair cable 137. The wireless subscriber 130 then places a call using dual-tone multi-frequency (DTMF) tones from telephone 138 which are recorded and stored in memory of the remote transceiver 136 at step 142. At step 144, remote transceiver 136 establishes a connection with wireless base station 132 by selecting an open channel within the predetermined electromagnetic spectrum 135 and establishes a link to the wireless base station 132 by utilizing a high powered low gain antenna system including radio tower 120. Once the link is established, the stored DTMF tones representing the called number are converted to a digital format in a conventional manner and transmitted from the remote transceiver 136 to the wireless base station 132 at step 146. Once received by the wireless base station 120, the DTMF tones are converted to a T-carrier format and sent to PBX 42 via a T1 or higher connection 133. The binary digits are then compared to the pre-programmed route table in the PBX 42, and processing at steps 94–108 is repeated as in the embodiment of FIG. 2, with the exception that the development is now expanded to include the wireless subscribers 130 connected to the PBX 42. In particular, at step 94, the route table identifies the call as a local call serviced by PBX 42, as a local call not serviced by PBX 42, or as a long distance call. If the call is a local call to a number serviced by PBX 42, the PBX 42 routes the call at step 96 to the analog port 76 assigned to the designated subscriber as in a conventional PBX office setup. On the other hand, if the call is a local call not serviced by PBX 42, at step 98 the PBX 42 routes the call to the DS1 card provided for DOD, where the DS1 digitizes and formats the call for common carrier service at step 100. The call is then forwarded at step 102 to the Incumbent LEC switch 66, such as a 5ESS, via DS1 trunk line 44 for delivery to the PSTN at step 102. However, if the route table identifies the call at step 94 to be a long distance call, at step 104 the PBX 42 routes the call to the DS1 card provided for long distance, where that DS1 digitizes and formats the call for common carrier service at step 106. The call is then forwarded at step 108 to the DEXCS frame 24 at the Incumbent LEC Central Office 14 via DS1 line 46 for delivery to the long distance network.

Calls originated by a subscriber 10 in new housing developments 73 or 64 use the techniques described above and no further description is necessary.

Figure 8:
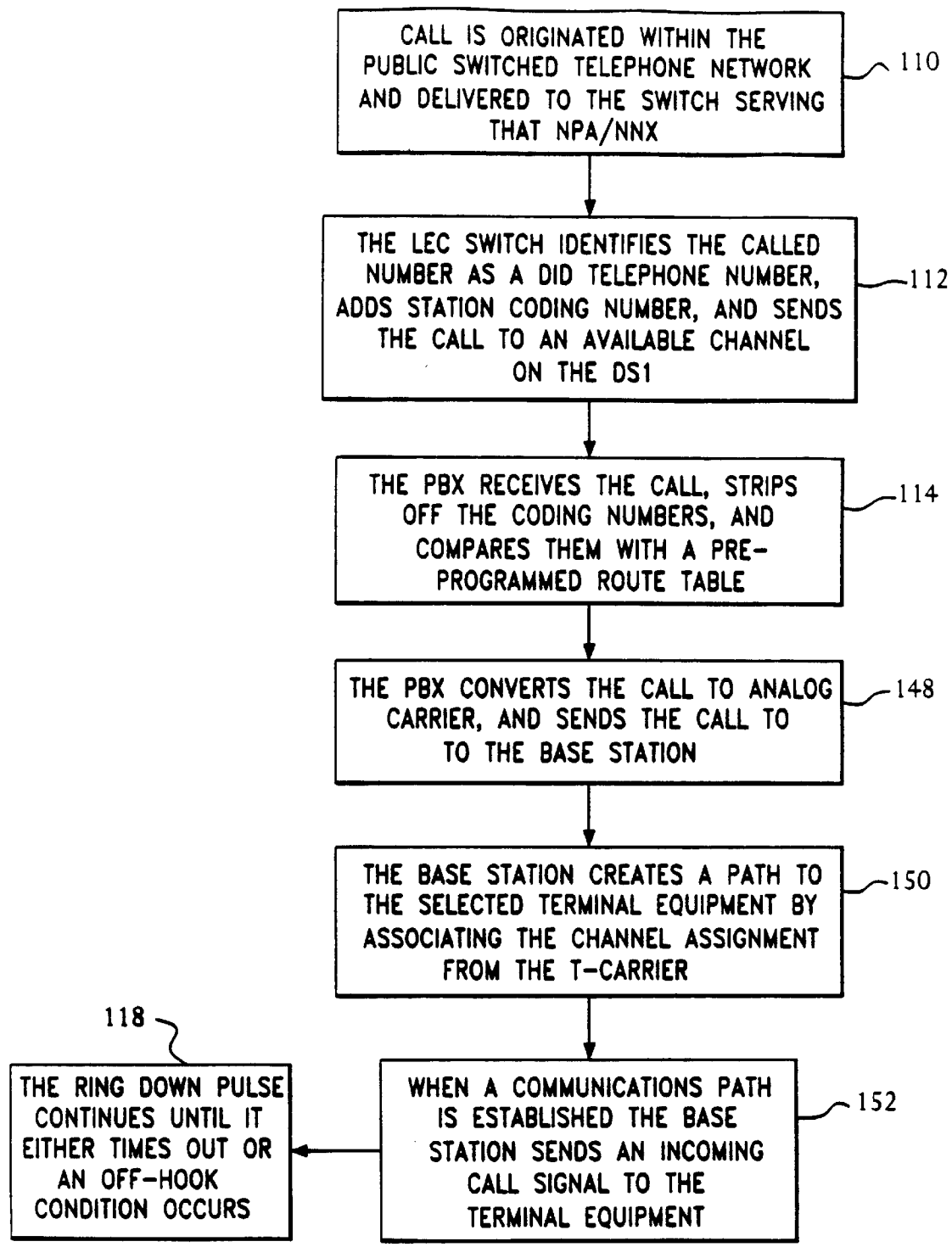
FIG. 8 illustrates the flow of an incoming call to a subscriber's premise outside the new residential housing development using fixed wireless local loop technology in accordance with the embodiment of FIG. 6.

Incoming calls to a wireless subscriber 130 are handled as illustrated in FIG. 8. In particular, as in the embodiment of FIG. 3, a call originated within the PSTN designating the prefix for Incumbent LEC switch 66 is delivered at step 110 to Incumbent LEC switch 66 in a conventional manner. At step 112, the Incumbent LEC switch 66 identifies the called number as a DID telephone number, adds station coding numbers, and sends the call to an available channel of the DS1 trunk line 72 to the PBX 42. At step 114, PBX 42 receives the call, strips off the coding numbers, and compares them with the pre-programmed route table in the PBX 42. At step 148, the PBX 42 converts the call to analog carrier and routes the call to the wireless base station 132 via a T1 or higher connection 133. At step 150, the wireless base station 132 creates a path to the selected wireless transceiver 136 by associating the selected channel assignment from the T-carrier 133 and cross-referencing it to a stored database to determine the remote transceiver ID. Once a path 135 is established, at step 152 the wireless base station 132 sends an incoming signal to the remote transceiver 136 which, in turn, sends a ring down pulse to the subscriber's telephone 138 at step 118 and continues to do so until either the subscriber telephone 138 goes to an off hook condition or the incoming call signal is terminated by the wireless base station 132. When the subscriber's telephone 138 goes to an offhook condition, the call is then routed from the PBX 42 to the wireless base station 132 and transmitted in accordance with the existing wireless protocol. Calls to a subscriber 10 in new housing development 64 or 73 are routed using the techniques described above and no further description is necessary.

By using the Independent Central Office as a platform for deploying fixed wireless technology, those skilled in the art will appreciate that much of the expense of deploying the fixed wireless technology may be eliminated. In particular, approximately 68% of the expense in deploying wireless technology is tied to switching and interconnection infrastructure. Since the switching and interconnection costs of the wireline Independent Central Offices are already paid for by the revenue generated from the wireline subscribers in the new residential and commercial developments, much of this portion of the deployment costs for fixed wireless would be eliminated. Thus, fixed wireless technology, such as AT&T's Project Angel, could be implemented using the wireless platform of the invention at a fraction of the projected costs, thereby enabling fixed wireless technology to become a commercially viable option for providing access to the local telephone market currently dominated by the LECs.

Also, the use of an Independent Central Office 70 as a platform for fixed wireless local loop permits the PBX capabilities to be extended to all subscribers connected to the PBX 42 in the Independent Central Office. Those skilled in the art will also appreciate that the platform of the invention may lead to further reduced costs by allowing a smaller radio tower and less expensive transceiver equipment to be used than in conventional fixed wireless systems which do not have platforms in the residential communities and hence require greater signal ranges.

Those skilled in the art will further appreciate that the Independent Central Office of the invention may be made "independent" of the LECs using the bypass techniques described above or by simply building a new Central Office which is operated and maintained in a cost-effective manner by an entity other than the Incumbent LEC. Those skilled in the art will further appreciate that several such Independent Central Offices in an area under development (such as the suburbs in a growing metropolis) may serve as the fixed wireless backbone of a regional and national fixed wireless network which is owned and operated completely independent of the Incumbent LECs.

Although exemplary embodiments of the invention have been described in detail above, those skilled in the art will readily appreciate that many additional modifications are possible in the exemplary embodiment without materially departing from the novel teachings and advantages of the invention. For example, another modulation scheme besides the foreign exchange modulation scheme may be implemented in accordance with the invention. Also, those skilled in the art will appreciate that in each case the T1 data lines described may be T1 or greater high capacity data lines (e.g., T3, OC3, OC12). In addition, those skilled in the art will appreciate that other telephone equipment besides a PBX may be used to provide the switching and Central Office functions at the Independent Central Office. The Independent Central Office may also house electronics in support of numerous other functions. For example, Internet access facilities, and alarm monitoring devices may be installed at the Independent Central Office. Moreover, the switching equipment need not be analog but may be completely digital. Furthermore, the Independent Central Office need not be located within the new residential housing development or new commercial development but may be nearby or remote and connected to the wiring terminals using any of a number of wired or wireless protocols. Accordingly, these and all such modifications are intended to be included within the scope of this invention as defined in the following claims.

I claim:

1. A method of providing local telephone services to telephone subscribers by providing access by said subscribers to the public switched telephone network, comprising the steps of:

placing a telecommunications switch in or near a residential housing/commercial development in proximity to said subscribers;

providing direct inward dialing (DID) and direct outbound dialing (DOD) to said telecommunications switch via respective DID and DOD trunk lines from a Central Office switch of a local exchange carrier (LEC) tariffed for voice services, whereby respective subscriber premises connected to a subscriber side of said switch are connected to said public switched telephone network via said telecommunications switch, said DID and DOD trunk lines, and said Central Office switch;

connecting a fixed wireless base station to said subscriber side of said telecommunications switch; and connecting a plurality of subscribers in said proximity to said telecommunications switch via radio frequency links with said fixed wireless base station.

2. A method as in claim 1, comprising the additional steps of:

connecting said telecommunications switch to a particular output terminal of digital switching means using first multichannel digital data lines; and connecting said particular output terminal of said digital switching means to a long distance network, said digital switching means connecting said telecommunications switch to said long distance network via said first multichannel digital data lines.

3. A method of providing local telephone switching services to telephone subscribers in a residential housing/commercial development using a switch at a Central Office facility which is maintained independent of a LEC switch at an incumbent local exchange carrier Central Office facility, comprising the steps of:

building said Independent Central Office facility in or in proximity to said residential housing/commercial development;

connecting customer premise equipment of said telephone subscribers to said switch at said Independent Central Office facility via a fixed wireless local loop; and providing direct inward dialing (DID) and direct outbound dialing (DOD) to said switch of said Independent Central Office facility via respective DID and DOD trunk lines from said LEC switch at said incumbent local exchange carrier Central Office facility.

4. A Central Office facility located in or in proximity to a residential/commercial development including a plurality of subscriber premises, said Central Office facility being maintained independent of a switch tariffed for voice services at an incumbent local exchange carrier (LEC) Central Office facility, comprising:

a private switch having a plurality of subscriber side ports and a plurality of LEC side ports;

a fixed wireless local loop communications system which connects customer premise equipment at said plurality of subscriber premises to said subscriber side ports of said private switch; and a channel service unit for each of said plurality of LEC side ports, certain of said channel service units connecting said private switch to said switch tariffed for voice services at said incumbent LEC Central Office facility via DID/DOD trunk lines.

5. A Central Office facility as in claim 4, wherein said fixed wireless local loop communications system comprises a wireless base station connected to said subscriber side ports of said private switch, and a radio tower connected to said wireless base station so as to provide a wireless communications link between said customer premise equipment and said wireless base station.

6. A Central Office facility as in claim 4, wherein other of said channel service units connect said private switch to multichannel digital lines, which are further connected via a switch at said incumbent LEC Central Office facility, to a long distance network for the provision of long distance voice telecommunications services to said subscriber premises via said private switch and said fixed wireless local loop.

* * * * *